E. E. WINKLEY.
BOTTLE HANDLING AND TESTING MECHANISM.
APPLICATION FILED AUG. 7, 1914.

1,316,549.

Patented Sept. 16, 1919.
5 SHEETS—SHEET 1.

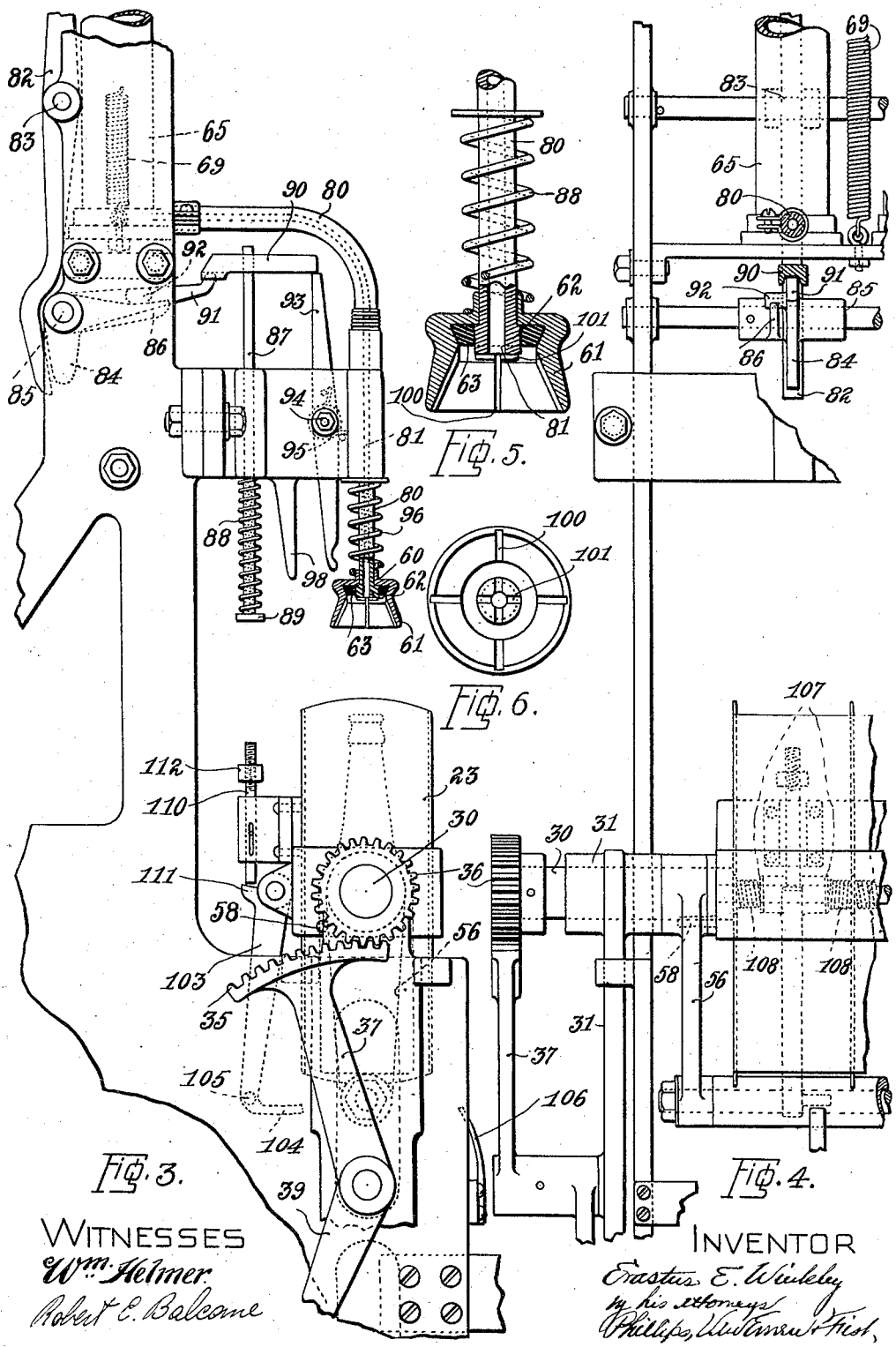

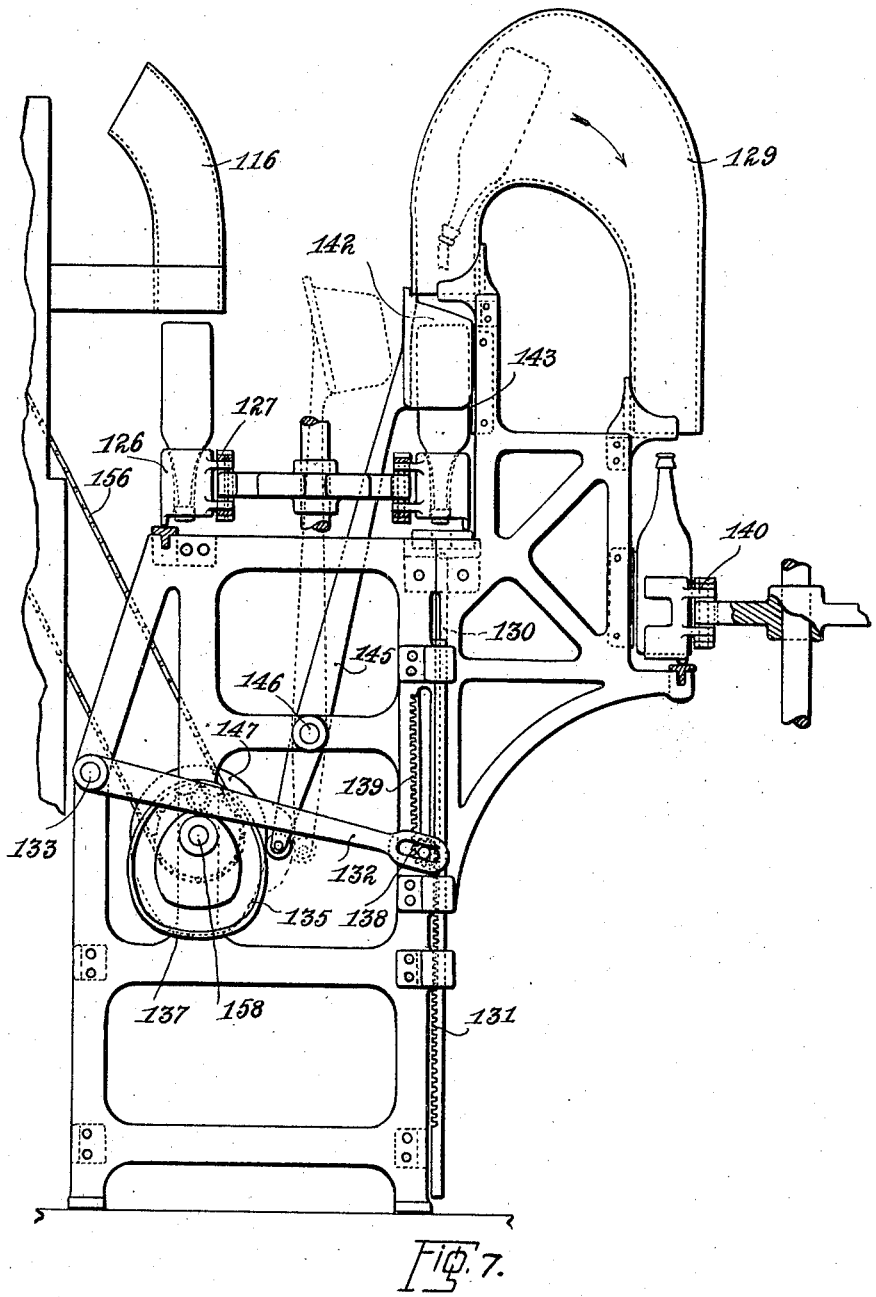

UNITED STATES PATENT OFFICE.

ERASTUS E. WINKLEY, OF LYNN, MASSACHUSETTS.

BOTTLE HANDLING AND TESTING MECHANISM.

1,316,549.  Specification of Letters Patent.  Patented Sept. 16, 1919.

Application filed August 7, 1914. Serial No. 855,553.

*To all whom it may concern:*

Be it known that I, ERASTUS E. WINKLEY, a citizen of the United States, residing at Lynn, in the county of Essex and State of Massachusetts, have invented certain new and useful Improvements in Bottle Handling and Testing Mechanism; and I do hereby declare the following to be a full, clear, and exact description of the invention, such as will enable others skilled in the art to which it appertains to make and use the same.

The present invention relates to bottle handling and testing mechanism, and more particularly to mechanism for testing the bottle to determine whether it is whole and free from imperfections and for reversing the position of the bottle in order that the succeeding operations may be conveniently performed.

One object of the present invention is to provide an improved form of mechanism for testing a bottle to determine if it is free from cracks, nicks and other imperfections and to automatically handle the bottle during the testing operation. A further object of the invention is to provide improved mechanism for reversing the position of the bottle which enables the bottle to be delivered at a point best suited for the succeeding operations which are to be performed.

With these objects in view, the various features of the invention consist in certain novel constructions, combinations and arrangements of the parts hereinafter described and claimed, the advantages of which will be obvious to those skilled in the art from the accompanying description.

Figure 1:
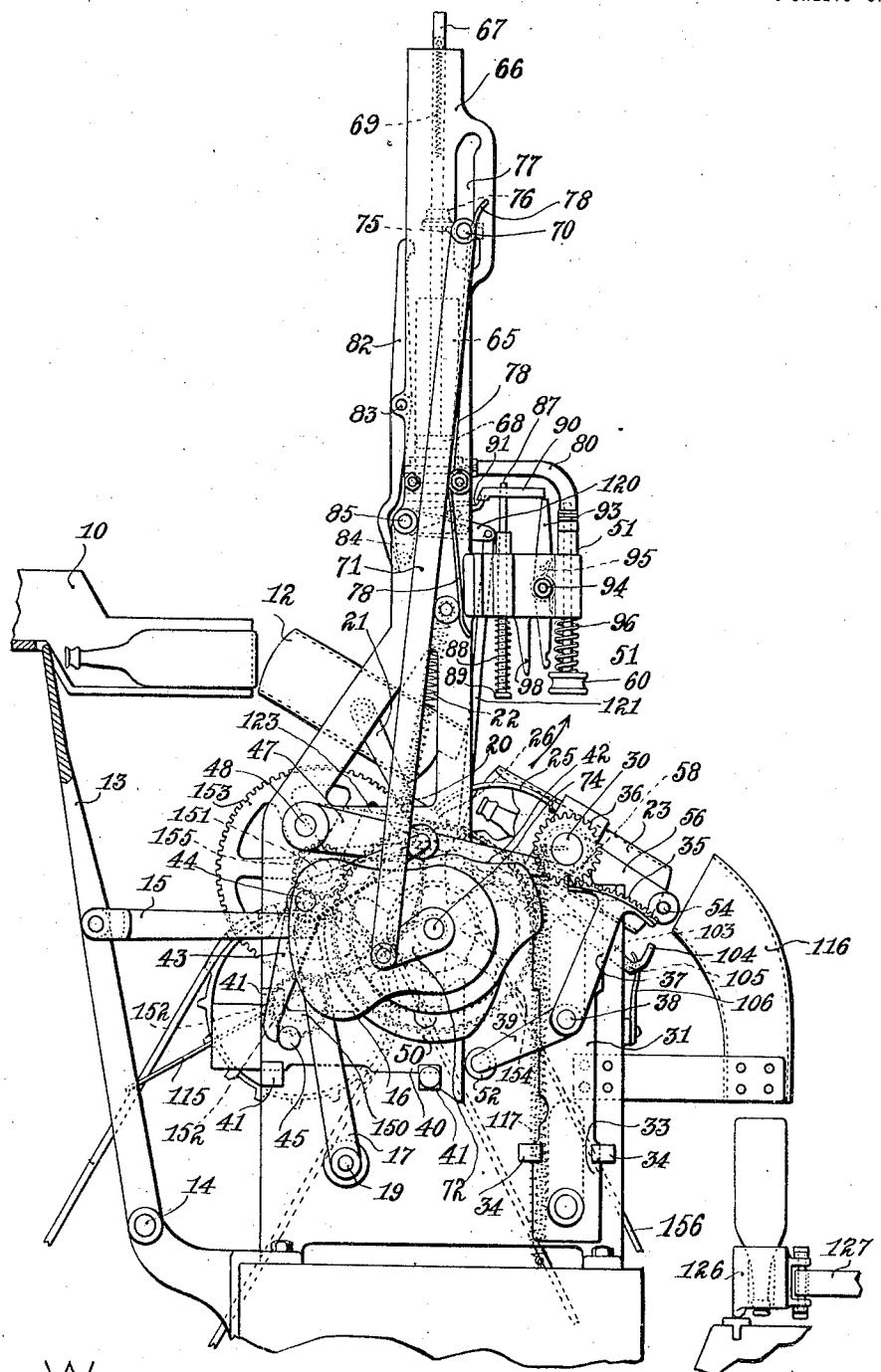
Figure 2:
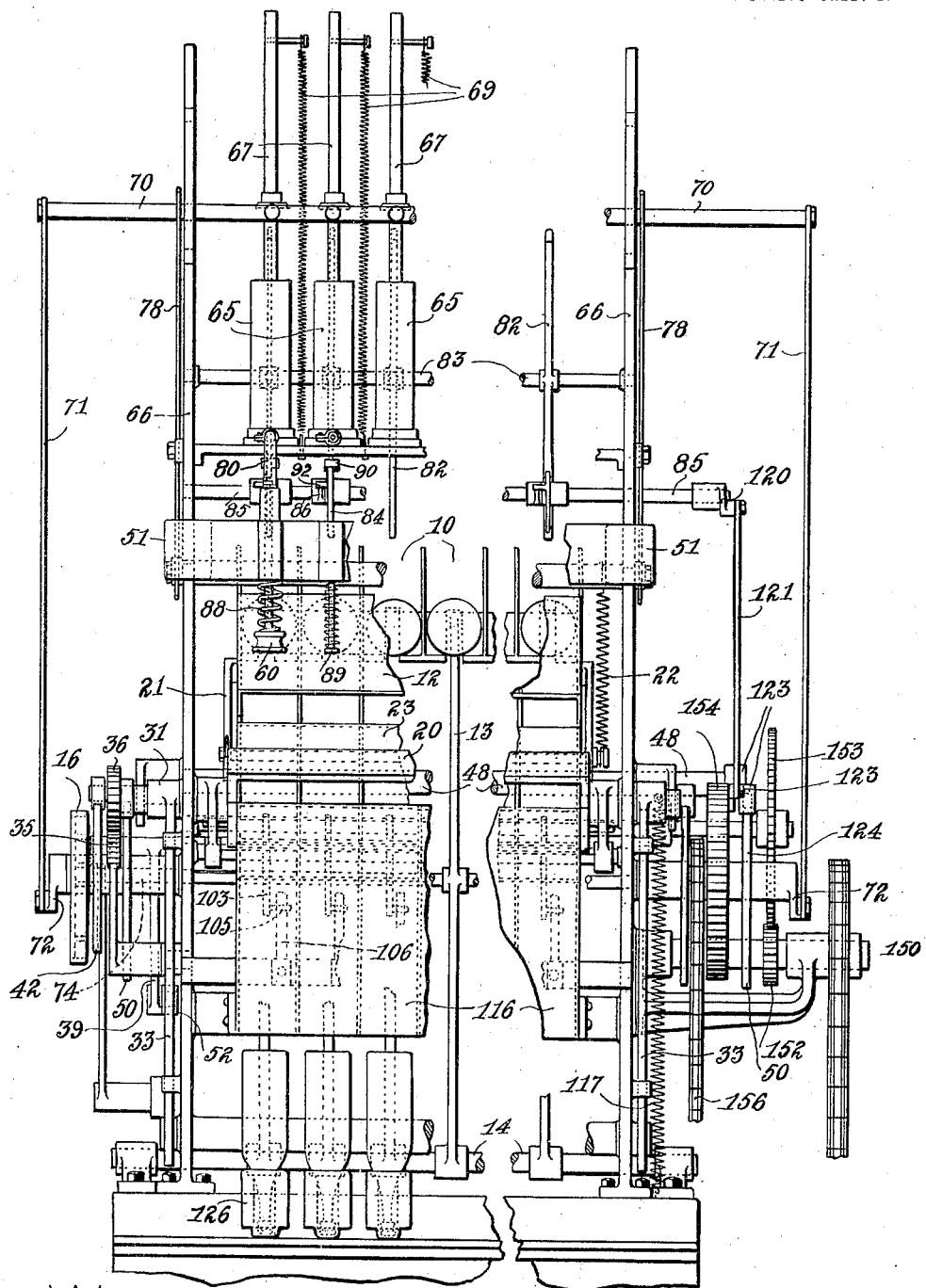
Figure 8:
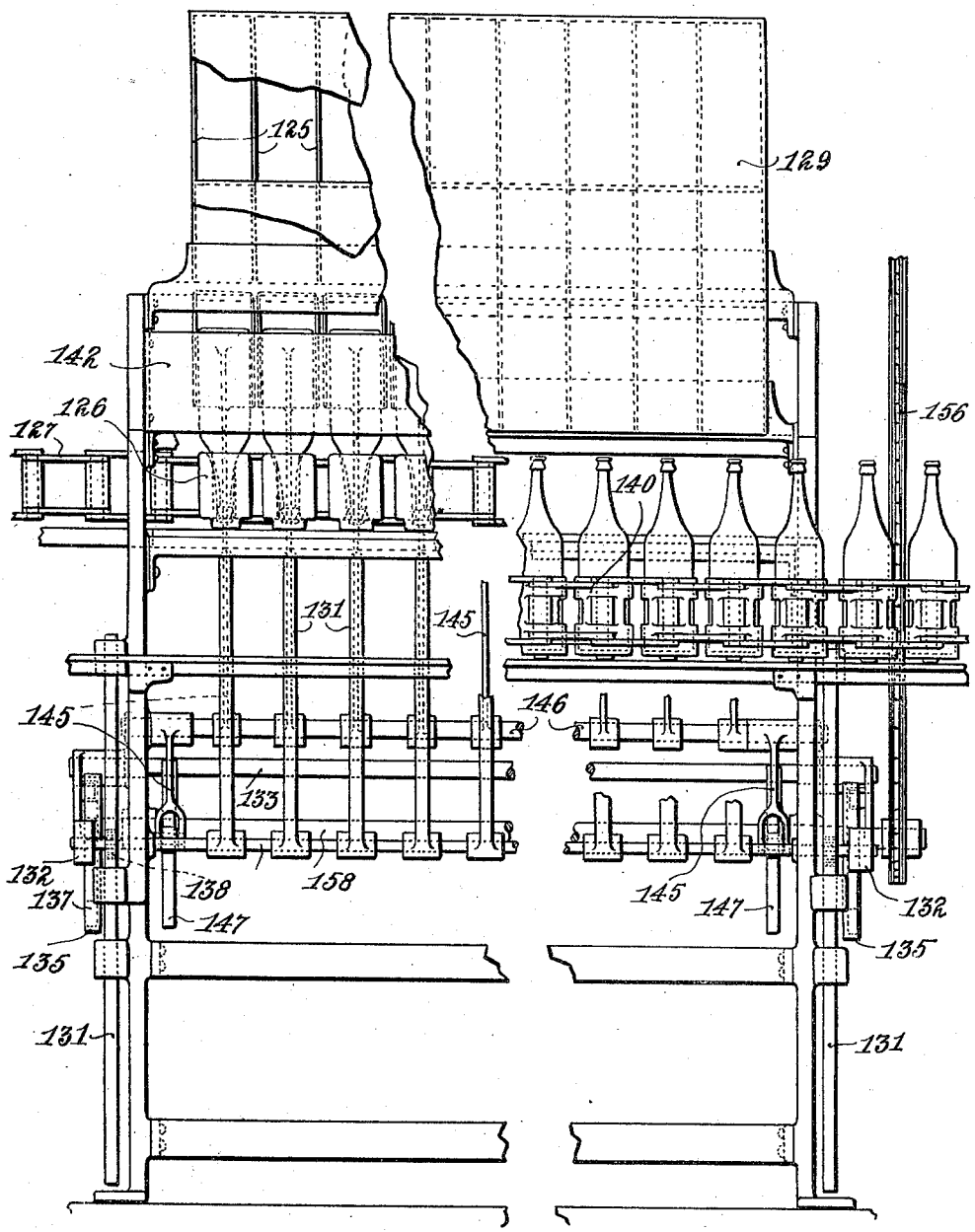

In the accompanying drawings illustrating the preferred form of the invention, Figure 1 represents a side elevation of the bottle testing mechanism and a means for handling the bottle during the testing operation; Fig. 2 is a front elevation partly broken away of the mechanism shown in Fig. 1; Fig. 3 is a detail illustrating a side elevation upon an enlarged scale of the mechanism for introducing pressure to the interior of the bottle; Fig. 4 is a detail illustrating a front elevation of the mechanism shown in Fig. 3; Fig. 5 is a detail illustrating an elevation partly in section of the bottle clamping head; Fig. 6 is a detail illustrating a bottom plan view of the clamping head; Fig. 7 is a side elevation of the mechanism for removing the bottle from the testing machine and reversing the position of the bottle; and Fig. 8 is a front elevation partly broken away of the mechanism shown in Fig. 7.

The present invention is designed primarily for use in connection with bottling machinery which automatically performs all of the essential operations arising in connection with the bottling of liquid. The first of these operations are intended to thoroughly clean the empty bottles inside and out in order to prepare them for the subsequent filling, capping and labeling operations, and in order that these operations shall be performed only on perfect bottles, it is desirable that each bottle be tested, and broken, cracked, or otherwise imperfect bottles shall be rejected.

In the illustrated embodiment of the invention, a row of bottles are delivered either mechanically or otherwise into a plurality of chutes 10, as shown clearly in Figs. 1 and 2, the bottles lying upon the chutes with their open ends facing to the rear. From the chutes the bottles are transferred simultaneously to a series of intermediate carriers 12 by arms 13, the working ends of which operate in slots formed in the bottoms of the chutes 10. The arms 13 are secured to a rock shaft 14 journaled in the machine frame and are operated to transfer the bottles by a link 15 connected at one end to the arms and having its opposite end operatively connected with a closed cam path formed upon one face of the cam disk 16. The inner end of the link 15 is supported by an arm 17 fulcrumed at 19 and connected to the arm at its upper end, as shown clearly in Fig. 1. The bottles, after being transferred from the chutes 10, slide down the inclined bottoms of the carriers 12 until they engage with a bar 20 supported at its opposite ends by arms 21 and normally retained in position across the open ends of the carriers by springs 22. The bottles are retained in the intermediate carriers until ready to be operated upon and are then discharged automatically into the series of receiving carriers 23. The receiving carriers are positioned initially, as shown in Fig. 1, to receive the bottles and are then rocked into a vertical position and are elevated in order to test the bottles, after which they are again depressed and oscillated still further to cause the discharge of the bottles at the proper points. The discharge of the bottles from the intermediate carriers 12 into the receiving carriers 23 is accomplished automatically when the receiving carriers are moved into the inclined position shown in Fig. 1. To this end, an operating finger 25 is secured to the receiving carriers and is arranged to operatively engage with an arm 26 extending from the bar 20 in order to depress the bar against the action of the spring 22 and allow the bottles to move from one carrier to the other under the action of gravity. After the bottles have been received in the carriers 23 they are rotated into a vertical position and the bar 20 immediately returns to its normal position across the open ends of the carriers 12 in order to retain the next succeeding bottles in position. In order to enable the proper movements to be imparted to the carriers 23, they are fulcrumed at 30 upon a sliding head 31. The head 31 is provided with depending slide members 33 which are guided by a plurality of lugs 34 formed upon the machine frame and operatively engaging with opposite sides of the members 33. The oscillatory movement of the carriers is imparted by a toothed segment 35 which meshes with a gear 36 secured to the shaft 30. The gear segment 35 is formed upon one arm 37 of a bell crank fulcrumed at 38 and having a second arm 39 which operatively engages with the face of a sliding cam plate 40. The cam plate 40 is guided by a plurality of lugs 41 formed upon the machine frame and is actuated by a peripheral cam 42 through a bell crank 43 fulcrumed at 44. One arm of the bell crank 43 operatively engages with a stud 45 secured to the cam plate 40 to advance the cam plate and oscillate the carriers the requisite amounts. After the bottles have been received in the carriers 23, the carriers are first rocked into a vertical position in order to present them properly for the operation of the testing mechanisms and the head 31 is then elevated to move the bottles into engagement with the testing head. To this end, the opposite ends of the shaft 30 are engaged upon the under side by elevating arms 47 which are secured to a rock shaft 48 and are operatively connected with the periphery of a cam disk 50 to elevate the head and bottles carried thereby into operative relation with the testing head indicated at 51 and to maintain the head in this position during the testing operation. It will be noted from an inspection of Fig. 1, that the cam plate 40 is provided with an elongated working face which engages with a cam roll 52 journaled upon the end of the arm 39, thus permitting the elevation of the head 31 without disturbing the operative relation of the cam plate 40 and arm 39. The bottles are retained in the carriers 23 by a bar 54 supported at its opposite ends upon the arm 56 and extending across the bottoms of the carriers. The arm 56 is fulcrumed loosely upon the shaft 30 and the position of the bar across the bottoms of the carriers is insured by the engagement of the arm 56 with a stud 58 secured in the head, as shown clearly in Figs. 3 and 4, this stud retaining the bar in position beneath the carriers, when in the position shown in Fig. 1, and during the movement from this position into a vertical position shown in Fig. 3. As stated previously, the head 31 is elevated to move the open ends of the bottles into engagement with a plurality of clamping heads 60. Each clamping head, as shown clearly in Figs. 3 and 5, comprises an outwardly flared depending apron 61 and a tubular member 62 arranged to project within the interior of the bottle, and a yielding packing strip 63 which engages with the top of the bottle and forms a seal for the open end. After the bottle is clamped in position against the head, it is tested by applying pressure to the interior of the bottle which, if free from imperfections, will prevent the escape of air and maintain the pressure substantially constant, and if cracked, nicked, or broken, will permit the escape of the air and allow the pressure to drop. This escape of pressure is conveniently utilized to control the operation of the bottle ejecting mechanism and governs the subsequent movements of the bottle. To this end, an air pump is operatively connected with each clamping head and, when the bottle is in operative relation to the clamping head, the piston of the pump is at the commencement of the working stroke which is imparted yieldingly. If the bottle leaks, the piston is allowed to move throughout the entire stroke to the end of the pump chamber forcing air out through the bottle, and if the bottle is tight, the piston is retained at the commencement of the working stroke. This variation in the movement of the piston through suitable connections governs the operation of the discharge mechanism as will be hereinafter described. A plurality of pump cylinders 65 are supported in the head 66 of the machine and each cylinder is provided with a pump rod 67 and a piston 68 connected to the rod and slidingly supported in the cylinder. The piston is normally maintained at the bottom of its working stroke by a tension spring 69 connecting the pump rod 67 with a fixed portion of the head, and is elevated by a transverse elevating bar 70 supported at its opposite ends upon elevating rods 71 which are operated by the crank arms 72 secured to the cam shaft 74. The elevating bar 70 is operatively connected at predetermined intervals with the pump rods to elevate the pistons and is then disconnected to permit the working stroke of the piston by the actuating spring 69. To this end, the elevating bar is guided in vertical slots 77 formed in the side members of the head 66 and is operatively connected with each pump rod by a dog 75 secured to the bar and engaging with the under side of a collar 76 secured to the pump rod. The dog 75 is normally maintained in engagement with the collar 76 by a spring member 78 bearing against the bar 70, as shown clearly in Figs. 1 and 2. In order to automatically disengage the bar from the pump rods, when the pistons have been completely retracted, the upper end of the slot 77 is outturned, as shown clearly in Fig. 1, in order to move the bar against the action of the spring 78 and to permit the movement of the pump rod under the action of the spring 69. Immediately upon the release of the pump rod, the piston commences its working stroke forcing air under pressure from the pump cylinder through a connecting pipe 80 into the hollow duct 81 formed in the head and leading directly into the open end of the bottle. If a perfect seal is maintained between the open end of the bottle and the clamping head, the downward movement of the piston will be arrested as soon as the pressure of air in the pump cylinder equals the tension of the spring, but if the air is allowed to escape between the bottle and the clamping head, the downward movement of the piston will continue until it reaches the end of the stroke. In order to utilize this variation in movement of the piston, a control lever 82 fulcrumed upon the side of the head at 83 operatively engages at its lower end with one arm 84 of a bell crank fulcrumed at 85. If the pump rod is retained in an elevated position by a perfect bottle, the collar 76 upon the pump rod is not allowed to descend to a position opposite the end of the lever 82, and in consequence, when the bell crank rocks about the fulcrum 85, the lower end of the lever 82 is free to move outwardly. If, however, the piston is allowed to completely descend, the collar 76 is positioned opposite the upper end of the lever 82 and holds the lever in the position shown in Fig. 1 preventing a rocking movement of the bell crank about the fulcrum 85 and a consequent downward movement of the horizontal arm 86 of the bell crank. The bell crank is operatively connected with a control rod 87 slidingly mounted in the testing head and normally depressed by a spring 88 surrounding the rod and interposed between an enlarged head 89 formed upon the rod and the testing head. The upper end of the control rod carries a bar 90 which is engaged upon its under side by an arm 91 having a projection 92 which rests upon the horizontal arm 86 of the bell crank. The opposite end of the bar 90 is engaged upon the under side by a lever 93 fulcrumed upon the testing head at 94 and normally retained in the position shown in Fig. 3 by a spring 95. The clamping head 60 is normally retained in the position shown in Fig. 3 by a spring 96 which permits an upward movement of the clamping head. Upon a continued upward movement of the bottle carrier, the upward movement of the clamping head trips the control rod 87 by the engagement of the head with the lower end of the lever 93 and a consequent movement of the upper end of the lever from beneath the bar 90. Immediately upon being tripped by the lever 93, the control rod will move downwardly unless maintained in elevated position by the arm 91. With this construction it will be noted that if the bottle is perfect, the arm 91 is not maintained in an elevated position and allows the dropping of the control rods 87, but if the bottle is imperfect, the downward movement of the arm 91 is resisted by the bell crank and lever and the control rod 87 is maintained in the elevated position shown in Fig. 3. In order to guide the carrier in its upward movement and insure that the bottle shall be centered accurately with relation to the clamping head, a depending finger 98 is secured to the testing head and is arranged to engage with the side of the bottle carrier 23 as it moves upwardly. In addition to determine whether the bottle is free from cracks and imperfections, the clamping head is so arranged that it rejects bottles which are too large or too small. This is accomplished by so proportioning the apron 61 and the tubular member 62 that they are arranged to respectively fit the outside and inside of the bottle head and if the bottle is too large, the head will not project within the apron a sufficient distance to engage the packing member 63, and if too small, the member 62 will not project within the neck of the bottle. In order to insure the escape of air if the head of the bottle does not engage firmly with the packing ring 63 the apron 61 is provided with a series of slots 100 as shown clearly in Figs. 5 and 6 and the lower face of the member 62 is provided with corresponding slots 101, these affording ample provision for the passage of air in case the head does not engage with the packing ring. As stated, previously, the bottles are retained in the carriers 23 by a bar 54 during the operation of the testing mechanism, but after the bottles have been tested and upon a continued rocking movement of the carriers in the direction of the arrow, shown in Fig. 1, the bar 54 which is loosely supported upon the shaft 30 remains in a vertical position. If the bottle is imperfect and is to be rejected, the oscillation of the carrier immediately allows the bottle to drop out of the carrier as soon as released by the bar 54, but if perfect, it is not allowed to drop out of the carrier immediately and is carried on to a farther point. To this end, a series of retaining arms 103 are fulcrumed upon the head 31 and are provided with inturned lower ends 104 arranged to project beneath the open ends of the carriers to sustain the bottle in the carrier. In order to remove the retaining members 103 from operative relation with the carriers, when in the position shown in Fig. 1, each arm is provided with a stud 105 which engages with an upstanding arm 106 to limit the movement of the arm 103. In order to retain the arm 103 in any position into which it is moved, the hub of the arm is held between friction heads 107 yieldingly pressed against the hub by springs 108, as shown clearly in Fig. 4. The movement of the arms 103 into operative relation with the carriers is governed by the control rod 87, the arm being moved into operative position if the bottle is perfect and being allowed to remain in inoperative position if the bottle is imperfect, as shown in Figs. 1 and 3, and is to be rejected. To this end, a pin 110 is slidingly supported on the head 31 and is arranged to engage with a tail 111 formed upon the upper end of the arm 103. Upon the elevation of the carrier head 31, the pin 110 is moved into operative relation with the control rod 87 and if the control rod is allowed to drop, the pin is actuated to rock the lower end of the arm 103 beneath the open end of the carrier and retain the bottle in place. This downward movement of the pin being limited by a stop collar 112 threadedly supported upon the pin and engaging with the upper face of the head 31. The provision of this adjustable stop collar enables the position of the retaining arm to be accurately determined for different size bottles, as it is obvious that the end 104 of the arm should project farther beneath the carrier for a small bottle than for a large one.

After the bottle has been tested, the carrier head is depressed and the cam plate 40 is again advanced to continue the oscillation of the receiving carriers 23. This continued movement, as stated previously, disengages the bar 54 from beneath the bottles and permits the discharge of the bottles on to a discharge apron 115 if imperfect and not retained in the carriers by the arm 103. If the bottles are perfect, they are retained in the carriers during the continued oscillation until the upper end of the carrier is positioned opposite the open end of a discharge chute 116 into which the bottle slides head foremost from the carrier 23. After the discharge of the bottles, the carriers are returned to their initial positions by tension springs 117, connecting the shaft 30 with the machine frame, as shown clearly in Figs. 1 and 2. In order to elevate the control rod 87 after it has operated into a position where it may be held by the lever 93, the shaft 85 to which the bell crank is secured is provided with an arm 120 connected through a link 121 with a second arm 123 fulcrumed upon the shaft 48. The arm 123 is operatively connected with the periphery of a cam disk 124, as shown clearly in Figs. 2 and 4, to elevate the control rod at the proper time.

The bottles, after being received in the discharge chute 116 are guided by a series of partitions 125, as shown clearly in Fig. 8, in order that they may drop into receiving pockets 126 formed in a bottle conveyer 127. As shown clearly in Figs. 7 and 8, the receiving pockets 126 are shaped to conform to the head and neck of the bottle, supporting the bottle firmly and centering it in the proper position. The bottles are carried by the conveyer 127 for a sufficient distance to allow them to drain properly, and are then presented to the mechanism for reversing them. The reversing mechanism is of an improved form and turns the bottles into an upright position in a minimum space, positioning them at any desired height for the performance of the succeeding operation. To this end, as shown clearly in Fig. 7, the bottles are presented successively beneath the open end of a curved reversing chute 129. As soon as the bottle is positioned beneath the chute, the lower end is engaged by an elevating rod 130 which is slidingly mounted in the frame and is provided with rack teeth 131. The rod is actuated by an arm 132, fulcrumed at 133, and operatively connected midway of its ends with a path cam 135 formed in a cam disk 137. In order to multiply the travel of the arm and cause the elevating rod 130 to travel through a greater distance, a pinion 138 is slidingly and rotatably supported in the end of the arm and engages upon one side with a stationary rack 139 and upon its opposite side with the rack teeth 131. With this construction, an upward movement of the arm 132 causes a like movement of the elevating rod 130 at twice the speed. The elevating rod removes the bottle from the conveyer and elevates it to the position shown in dotted lines in Fig. 7, when the bottle is allowed to tip by gravity and slides around and down the chute on to a second conveyer 140. The construction of the reversing chute is such that the head of the bottle engages with the side of the chute to prevent a too rapid descent of the bottle but allows sufficient room within the interior without danger of its becoming lodged at the turning point. As the bottles are supported upon the conveyer 127 only at their lower ends it sometimes happens that the bottle is tipped slightly in one direction or the other and if mechanism is not provided for guiding the bottle properly it will not enter the open end of the reversing chute 129. To this end, when each bottle is positioned beneath the chute, it is engaged by a curved guiding and positioning member 142, which presses the bottle against a fixed guide plate 143, the guide member 143 being provided with an interior guiding surface which registers with the lower edge of the chute to form a substantially continuous, unbroken, guiding surface for the bottle as it is elevated. The guide 142 is supported upon the upper end of a lever 145 fulcrumed at 146 and having its lower end operatively engaging with the periphery of a cam disk 147. The lever and guiding member are normally moved by gravity into the position shown in full lines in Fig. 7, and the cam disk 147 serves merely to move the guide into the inoperative position shown in dotted lines in Fig. 7. With this construction it will be noted that a minimum space is required for reversing the bottle and that the height of the receiving conveyer 140 may differ from that of the conveyer 127 in order to position the bottle properly for the succeeding operation.

The cam shaft 74 is operated from a main drive shaft 150 through reduction gearing supported upon a back shaft 151. The shaft 151 is operated through the intermeshing gears 152 and 153 and drives the cam shaft through gears 154 and 155 secured respectively to the cam shaft and back shaft. The mechanism for reversing the bottle is actuated by a drive chain 156 operatively connected at one end with the shaft 74 and at its opposite end with the cam shaft 158 upon which the cams 135 and 147 are mounted. It will be noticed that with this construction the various parts of the mechanisms are positively operated in order that the various mechanisms shall be actuated in timed relation to one another.

While it is preferred to employ the specific construction and arrangement of the parts shown and described, it will be understood that this construction and arrangement is not essential except so far as specified in the claims, and may be changed or modified without departing from the broader features of the invention.

The invention having been described what is claimed is:—

1. Bottle handling and testing mechanism comprising a bottle carrier, a testing head, and mechanism for oscillating the carrier to move it from an inclined bottle receiving position into a vertical position beneath the testing head, to retain it in position during the testing operation and to finally move the carrier into an inclined position from which the bottle may be discharged.

2. Bottle handling and testing mechanism comprising an oscillatory bottle carrier, an intermediate carrier, a testing head, and mechanism for actuating the bottle carrier to position it successively in alinement with the intermediate carrier and with the testing head.

3. Bottle handling and testing mechanism comprising a bottle carrier, a testing head, mechanism for actuating the carrier to move the open end of the bottle into engagement with the testing head, mechanism for applying pressure to the interior of the bottle, and means controlled by the pressure mechanism for discharging the bottle from the bottle carrier at different points in the travel of the carrier.

4. Bottle handling and testing mechanism comprising a bottle carrier, a testing head, mechanism for oscillating the bottle carrier from an inclined to a vertical position, mechanism for elevating the carrier to cause the open end of the bottle to engage with the testing head and for retaining the bottle in this position during the testing operation.

5. Bottle handling and testing mechanism comprising a bottle carrier, a testing head, a pressure pump having a piston slidingly supported therein, connections between the pressure pump and the testing head, and mechanism governed by the travel of the piston to control the discharge of the bottle from the carrier.

6. Bottle handling and testing mechanism comprising a bottle carrier, a testing head, a pressure cylinder, a piston slidingly supported in the cylinder, means for retracting the piston in the cylinder, and means for imparting a yielding, working stroke to the piston to apply pressure to the interior of the bottle.

7. Bottle handling and testing mechanism comprising a bottle carrier, a clamping head, mechanism for imparting a relative movement to the carrier and clamping head to move the open end of the bottle into engagement with the head, a depending slotted apron arranged to embrace the outside of the head of the bottle, a yielding gasket arranged to engage with the head and seal the open end of the bottle, and means for applying pressure to the interior of the bottle.

8. Bottle handling and testing mechanism comprising a bottle carrier, a clamping head having a depending slotted apron to embrace the outside of the bottle head, and a slotted member arranged to normally project within the head of the bottle, and mechanism for imparting a relative movement to the bottle carrier and clamping head.

9. Bottle handling and testing mechanism comprising a bottle carrier, a clamping head, means upon the clamping head arranged to engage with the outside and inside of the bottle head having provision for allowing the escape of air from the bottle if the head is not properly seated, and a yielding packing member arranged to normally seal the open end of the bottle.

10. Bottle handling and testing mechanism comprising a bottle carrier, a bottle sustaining hook, mechanism for actuating the bottle carrier, a control rod, and connections between the control rod and hook for moving the hook beneath the carrier at predetermined intervals.

11. Bottle handling and testing mechanism comprising a bottle carrier, a testing head, mechanism for relatively moving the bottle carrier and testing head, a control rod, and a latch for retaining the control rod in inoperative position arranged to be tripped upon engagement of the bottle with the testing head.

12. Bottle handling and testing mechanism comprising a control rod, means for normally depressing the rod, a testing head, an air cylinder, a piston contained therein, and connections governed by the movement of the piston for retaining the control rod in an elevated position.

13. Bottle handling and testing mechanism comprising a control rod, means for normally depressing the rod, an arm operatively connected to the control rod, a piston, and connections between the arm and piston for controlling the movements of the arm in accordance with the position of the piston.

14. Bottle handling and testing mechanism comprising a bottle carrier, a bottle sustaining hook, a control rod arranged to move the hook beneath the carrier to support a bottle contained therein, and connections between the control rod and hook having provision for adjustments to vary the inward movement of the hook beneath the bottle carrier.

15. Bottle handling and testing mechanism comprising a bottle carrier, mechanism for oscillating the carrier, and mechanism connected with the carrier for controlling the discharge of the bottle from the carrier.

16. Bottle handling and testing mechanism comprising a bottle carrier, a bottle sustaining hook arranged to close one end of the carrier, and mechanism for actuating the carrier to cause the discharge of the bottle from the opposite end.

17. Bottle handling and testing mechanism comprising a bottle carrier, means for oscillating the carrier, means for sustaining a bottle in the carrier when in a vertical position and arranged to permit the discharge of the bottle when moved to an inclined position.

18. Bottle handling and testing mechanism comprising a bottle carrier, a testing head, mechanism for oscillating the carrier, and control mechanism for causing the bottle to be discharged at a plurality of points.

19. Bottle handling and testing mechanism comprising a bottle carrier, a testing head, means for moving the bottle carrier from a position in alinement with the testing head into a position of discharge, means for applying pressure to the interior of the bottle when engaged by the testing head, and means controlled by the pressure applying mechanism for releasing the bottle from the carrier when the latter is positioned in alinement with the testing head.

20. Bottle handling and testing mechanism comprising a testing head, means for supporting a bottle in operative relation to the head, means for applying pressure to the interior of the bottle when engaged by the testing head including a pump having a variable stroke, and means controlled in accordance with the stroke of the pump for discharging the bottle from the carrier.

ERASTUS E. WINKLEY.

Witnesses:
 BURTON W. CARY,
 WARREN G. OGDEN.

Copies of this patent may be obtained for five cents each, by addressing the "Commissioner of Patents, Washington, D. C."